Oct. 23, 1923.

D. W. DRISCOLL 1,471,998

VARIABLE SPEED TRANSMISSION

Original Filed Aug. 27, 1919  5 Sheets-Sheet 1

Inventor
Daniel W. Driscoll
By his Attorney

Oct. 23, 1923.

D. W. DRISCOLL

VARIABLE SPEED TRANSMISSION

Original Filed Aug. 27, 1919

Inventor
Daniel W. Driscoll
By his Attorney

Oct. 23, 1923.

D. W. DRISCOLL 1,471,998

VARIABLE SPEED TRANSMISSION

Original Filed Aug. 27, 1919    5 Sheets-Sheet 4

Inventor
Daniel W. Driscoll
By his Attorney
Arthur Middleton

Oct. 23, 1923.

D. W. DRISCOLL 1,471,998

VARIABLE SPEED TRANSMISSION

Original Filed Aug. 27, 1919    5 Sheets-Sheet 5

Inventor
Daniel W. Driscoll
By his Attorney
Arthur Middleton

Patented Oct. 23, 1923.

1,471,998

UNITED STATES PATENT OFFICE.

DANIEL W. DRISCOLL, OF NEW YORK, N. Y., ASSIGNOR TO DRISCOLL PATENTS COMPANY, OF WILMINGTON, DELAWARE, A CORPORATION OF DELAWARE.

VARIABLE-SPEED TRANSMISSION.

Continuation of application Serial No. 320,300, filed August 27, 1919. This application filed December 24, 1919. Serial No. 347,162.

*To all whom it may concern:*

Be it known that I, DANIEL W. DRISCOLL, a citizen of the U. S. A., residing at New York, N. Y., have invented new and useful Improvements in Variable-Speed Transmissions, of which the following is a specification.

This invention involves a continuation and expansion of the fundamental idea which is the subject of my application No. 320,300, filed August 27th, 1919, to the extent that the present invention comprises the embodiment of the invention, which is shown in said earlier application in single form, in multiple or compound form, and the present invention also comprises the making of certain improvements in said original invention, which permit both the simple form and the compound form to be run at higher speeds and with less vibration than would otherwise be possible. It also comprises the production of a variable speed mechanism and particularly one of the type of said earlier application, which is continuous in the power transmitted, instead of intermittent, and especially such a mechanism as dispenses with, or may dispense with, a fly-wheel or other momentum reservoir or regulating means.

My invention is capable of embodiment in many different forms, and while I shall illustrate it by the best embodiment thereof known to me, such embodiment is to be regarded as only typical of many possible embodiments, and my invention is not to be confined thereto. Speaking more particularly:

In the invention of my said earlier application, a power member or power shaft produces an oscillatory movement of an impeller, which transmits motion to a driven member during that portion of its motion which is in the direction of travel of the driven member, and there is necessarily a period or periods when the impeller is not transmitting motion to the driven member, so that there must be in the variable speed mechanism, or in that which it is connected, a part or parts having sufficient momentum to keep up the speed of the driven member during the periods of inactivity of the impeller.

One of the objects of my present invention is to produce a variable speed mechanism having an oscillating impeller, in which the proportion of time during which the driven member is driven shall be increased over that possible in my earlier invention; and as one good embodiment of such idea I have improved such earlier mechanism by compounding it, so that a plurality of impellers act at different times upon the driven member.

I have also desired to produce a variable speed mechanism, in which an oscillating impeller engages a driven member which shall be capable of continuously transmitting motion to the driven member; and as a good embodiment of this aspect of my invention, I have not only compounded the mechanism shown in my earlier application, but have so synchronized the various impellers that the time when the second impeller shall engage the driven member beyond yielding shall be substantially co-incident with the time when the first impeller disengages to the point of yielding; and to such ends I preferably cause said impellers to begin to release and to engage, respectively, at overlapping times.

The compounding of the mechanism involving a single impeller, and especially compounding to the extent that the impelling effort is continuous, enables me to dispense to a greater or less extent with the fly-wheel or other momentum-regulating means of the earlier application for patent.

I have for convenience and simplicity embodied these various means and aspects of my invention in a single mechanism, which, as stated, is a development of the simpler mechanism in my earlier application for patent, but I fully realize that they are capable of widely different embodiments.

The embodiment hereindescribed is illustrated in the accompanying drawings in which—

Fig. 9 shows in perspective the standard 80 with the sliding block 70 therein with a top cap or bridge for tying the free ends of the standard together.

Fig. 10 shows a side elevation of the pin 71 adapted to pass through the block 70 and to which the levers 72 are secured.

Fig. 11 shows a section taken along 11—11 in Fig. 10.

Figures 3, 12, 13:
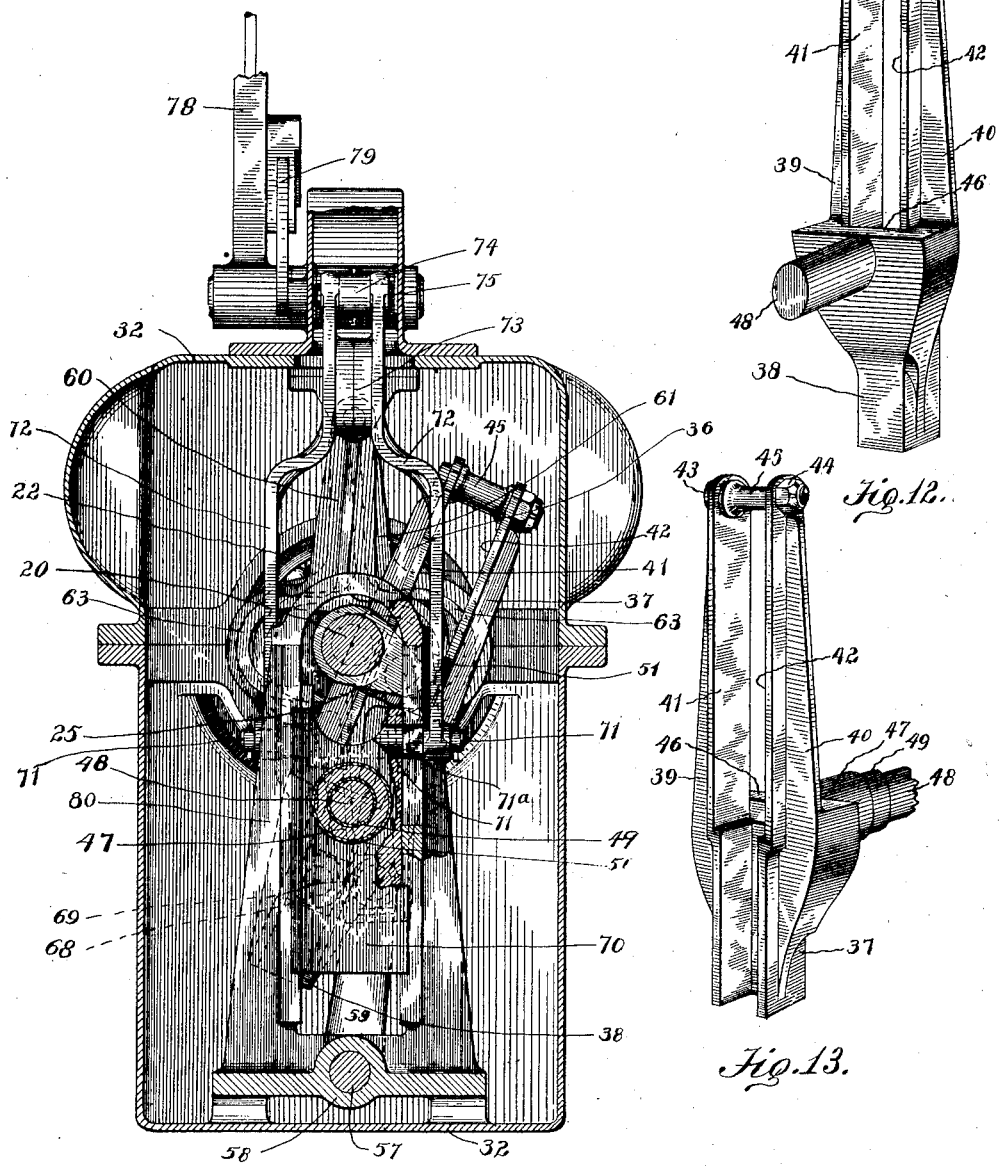
Fig. 3 is a section with parts omitted taken along 3—3 in Fig. 1 showing the cranks at 60° from vertical but with the fulcrums of the oscillatory intermediaries at the mean position.

Fig. 12 is a perspective view of oscillator 38.

Fig. 13 is a perspective view of oscillator 37.

Figure 14:
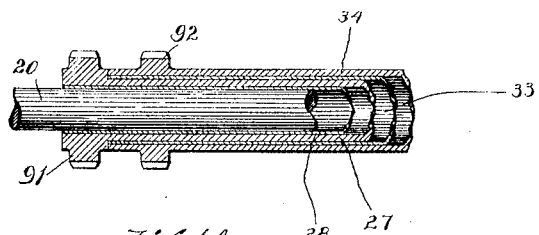
Figures 4, 15:
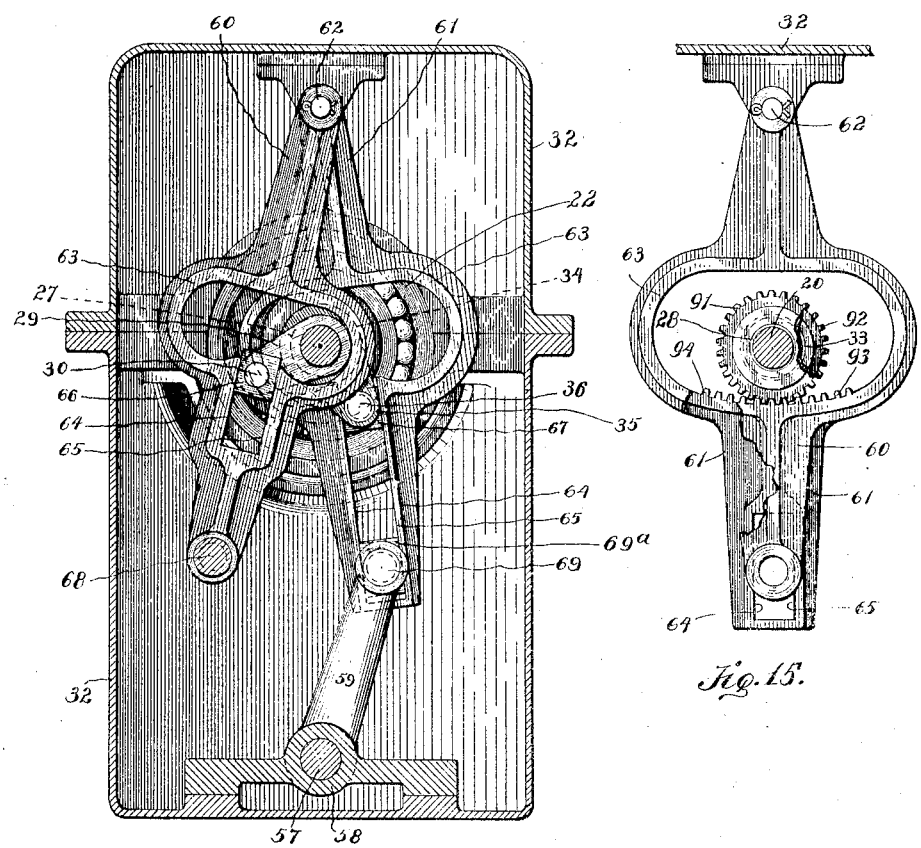
Fig. 4 is a section taken along 4—4 in Fig. 1 showing the parts in similar position as in the foregoing view.

Figs. 14 and 15 show a modified form of connection between levers 60 and 61 and rock sleeves 34 and 27 respectively.

In that embodiment of my invention which I have chosen for the purpose of illustrating the invention in the accompanying drawings, the following elements or groups of elements occur in the following order, leading from the driving member to the driven member: The driving member, or power shaft, and the oscillator or oscillators driven thereby, a control or control group for adjusting the effective range of movement of the oscillator or oscillators, an impeller or impellers actuated by the oscillator or oscillators, and a driven element or group which is actuated by the impeller or impellers.

*Power shaft group.*

My mechanism is designed to transmit motion of any kind from a driving member of any kind to a driven member of any kind with the capacity for varying the extent of motion transmitted. In the present instance the driving member consists of a driving shaft 20 forming a part of or connected to the shaft of a prime mover or other source of power, extending through the transmission housing 32 and supported by bearings 21, 22 and 23. This shaft is provided with cranks 24 and 25 and at its inner end carries a gear 26 keyed thereto.

Encircling the driving shaft 20 intermediate of its length within the transmission housing 32, is an oscillatable sleeve 27 having between it and the driving shaft a suitable bushing 28. At its forward end, this sleeve 27 is provided with a crank or arm 29 in which is carried a pin 30. Encircling this sleeve 27 is another bushing 33, similar to 28, and around that is another oscillatable sleeve 34, having a crank or arm 35 on its inner end in which is carried a pin 36.

*Oscillator group.*

In accordance with my invention, the motion of the driving member is transmitted to an oscillating member or group, which latter transmits motion to the part or parts by which the impellers are actuated, the oscillator or oscillators being so constructed that the proportion between the motion received and the motion transmitted can be varied by suitable control mechanism. In the present instance, the oscillator group comprises two levers 37 and 38, each composed of two side members, 39 and 40, which are preferably T-shaped in cross section for the purposes of strength, having opposing flat faces 41 and 42. These side members are connected together at one end by a bolt 43, nut 44 and thimble 45 and are integrally interconnected to each other intermediate their ends by a laterally extending bridge 46.

The bridge 46 of the oscillator 37 terminates in a cup-shaped or hollow boss 47 adapted to fit into the transverse opening 80$^a$ in sliding block 70 (hereinafter described) wherein it is journalled, a brass or other liner or bushing 50 being provided thereareound.

The bridge 46 of the oscillator 38 terminates in a boss or bearing stud 48 of such size as to fit into the hollow interior or journal of the boss 47 on oscillator 37 and is adapted to be journalled therein with a brass liner or bushing 49 thereareound. The oscillators 37 and 38 are thus both pivotally supported from the sliding block 70 by having 37 journalled directly in the block and having 38 journalled in the hollow journal of 37.

In the upper part of the oscillators 37 and 38 and sliding between the flat faces 41 and 42 are blocks 50 and 51 respectively adapted to be engaged by cranks 24 and 25 on the driving shaft 20. In the lower part of the oscillators 37 and 38 and sliding between the flat faces below the pivotal point of the oscillators are blocks 52 and 54 respectively, having pins 53 and 58 journalled therein respectively. Pin 53 is carried by an arm 56 attached to a rock shaft 57 journalled at 58 from the base of the housing 32 and provided with an arm 59, similar to 56, whereby the arm 56, shaft 57 and arm 59 form a rocking unit which may be called R for conveying rocking or pivotal movement from oscillator 37.

The oscillators 37 and 38 could be made to telescope down into pivoted cups forming a part of the rocker unit R if it is desired to lower the extreme height of the transmission casing and to lessen the throw of the upper part of the oscillators to reduce possibility of vibration at high speeds of the oscillators.

*Control group.*

In the illustrated embodiment of my invention the control group or mechanism for varying the proportion of motion received and transmitted by the oscillator or oscillators comprises a construction as follows:

A slidable block 70 is formed with two laterally extending bosses 71 accommodating on their free extremities bent levers 72 which levers abut at 73 and are pivoted at 74 on a shaft 75 supported from an arm 76 fixed to a shaft 77 which shaft is rotatable by a handle 78 coacting with a quadrant 79. Movement of the handle 78 moves the shaft 77 and arm 76 as a unit, which in turn either raises or lowers the levers 72 and the block 70, the latter sliding between guides in standard 80 upstanding from the bottom of the transmission housing 32. This standard may be provided with a bearing for the driving shaft 20 if desired. 80$^a$ represents a transverse opening through the block 70 from which the oscillating levers 37 and 38 are pivotally supported. A pin 71' passing through the block 70 could be substituted for the bosses 71. It may be prevented from rotating by means of squared portions 71$^a$.

60 and 61 represent levers having a common fixed pivot at 62 supported from the top of the housing 32. These levers have an enlarged hollow or heart-shaped central portion 63 to permit pivotal movement of these levers without interfering with the driving shaft which passes through this enlarged hollow portion of the levers. This enlarged portion 63 terminates downwardly into two opposed faces 64 and 65 between which in lever 60 a block 66 is adapted to slide and between which in lever 61 a block 67 is adapted to slide. Block 66 has journalled therein pin 30 of crank 29, and block 67 has journalled in it, pin 36 of crank 35. The lower extremity of the lever 60 carries a pin 68 which connects it to block 54 in the lower extremity of oscillator 38 and the lower end of lever 61 carries a pin 69 in a block 69$^a$ which pivotally connects it to the arm 59 of the rocker unit R.

Instead of the arms, pins, and co-acting blocks in levers 60 and 61, the modification shown in Figs. 14 and 15 may be used wherein sleeve 27 carries a gear 91 in lieu of the crank 29 and sleeve 34 carries a gear 92 in lieu of crank 35. The levers 60 and 61 are modified to each present a rack 93 and 94 with which gears 91 and 92 are adapted to mesh respectively. This is merely another means of causing rocking movement of the levers 60 and 61 to rock their co-acting rocking sleeves 27 and 34. This arrangement, however, has the advantage of rendering it possible to change the ratio of movement between the lever and its sleeve.

*Driven shaft group.*

As before stated, the driven member or group can be of any desired construction and may have any desired motion. In the present instance, such member has a rotary movement and one which is uniform. The illustrated construction is as follows:

The driven member is a shaft 82 journalled in bearings 83. At its forward end, the shaft is encircled by a coupling 84 having an internal gear 85 which may be made to mesh with gear 26 on the driving shaft 20 by means of a control handle 87 (or foot pedal) and its usual yoke 88 to directly connect the driving shaft 20 to the driven shaft 82.

Of course, it is entirely within the spirit of this invention to add any suitable reverse mechanism between the drive and driven shafts, in addition to the "forward" transmission hereinbefore described.

*Impeller group.*

The other features of my invention can be used to transmit motion to the driven member through impellers of various construction. In the present embodiment of my invention, the impeller group is constructed as follows:

The impeller arms 29 and 35 are splined upon impeller operating sleeves 27 and 34. The sleeve 34 has keyed upon it two eccentrics 102 and 103 which are positioned 180° apart. Upon each eccentric is mounted an impeller 106 and 107 respectively, with a series of rollers or other anti-friction means 104 and 105 interposed between the eccentrics and their impellers.

The impellers co-operate with and drive a rotatable part. They impinge upon the preferably internal cylindrical surface of a drum which in the present instance is indicated at 120. The impellers engage the internal cylindrical surface of the drum by a working face which is a counter-part of a portion of said surface, the said working face preferably being of the same radius as the said cylindrical surface. The impellers may be termed impeller shoes due to the fact that in cross section they are substantially T-shaped, with the head of the T contacting with the rotatable part to be driven. Therefore, when I refer hereinafter to an impeller shoe I mean an impeller whose head or surface contacting with the driven element is thicker than the body portion of the impeller proper.

When an eccentric is oscillated by its impeller arm, it first presses the working face of the impeller outwardly against the internal surface of the drum until the said surfaces are gripped together and then continued movement of the eccentric carries the impeller and drum with it in rotary motion.

At the start of said operation by the eccentric it is desirable to prevent the impeller from rotating with the eccentric, in order that the impeller may be thrust outwardly to grip the drum. When the eccentric has begun its return movement and has relieved its pressure on the impeller face, it is desirable to stop the impeller from travelling with the drum and to return it to its initial position. Such control of the impeller is effected by the following means: A plate 100 is mounted on the sleeve 34 and carries a pin or pins 101 which project into slots 117 and 112 respectively formed in the impellers 106 and 107. The pin or pins 101 have a fixed relation to the eccentric when the driven shaft is being driven forward. The parts are so related that, when the drum is to be driven forward, the impeller face 118 will under the influence of the pins 101 be on the forward side of the highest point of its eccentric when such face is retracted. The result is that when the eccentric starts on its forward oscillation it will first build up under the impeller and force its working face outward against the drum and will then carry the impeller and drum forward until the eccentric begins to slow down ready to begin its reverse oscillation. The impeller will tend to go forward with the drum, which will cause it to slide downhill on the eccentric, so to speak, until the impeller strikes the pin 101, when being released from the drum, it will be returned to its initial position by the said pin.

The impellers 106 and 107 are kept in phase by the pins 101 which extend through both of them. When the working face 118 of impeller 106 is operative, the working face 119 of impeller 107 is also operative but because their respective eccentrics are 180° apart, the said working faces both drive the drum forward.

A very important feature of the impeller mechanism is the placing of a series of antifriction rolls or balls 104 and 105 between the eccentrics and their impellers, or by the use of some other expedient, reducing the friction between the impeller and the eccentric to a point where it will be lower than that between the impeller and the drum. This substantially avoids causing the impeller to slide on and grind against the drum, as would otherwise occur when the impeller is under some pressure against the drum but is travelling slower than the drum as must occur both at the beginning and close of the period of contact between them, while the impeller is increasing its speed after the period of reversal and before it has reached its maximum speed at which it is substantially in synchronism with the drum and vice versa. Impellers or impeller shoes 106 and 107 are provided respectively with an extension 108 and 109, apertured at 110 and 111 and a bottom extension apertured at 112, 113, 114, and 115, 116, 117 and a "foot" 118 and 119, (which may or may not be wider than the body portion of the impeller or which may be added to the body instead of being made integral) curved to be complementary to the drum 120 surrounding these elements.

The pins 101 of the plate 100 enter apertures 117 and 112. 121 is a pin carried by and fitting the aperture 110 of impeller 106 which passes through aperture 116 of impeller 107, and 122 is a similar pin in aperture 111 and passes through aperture 113.

The above pair of impellers and plate just described are duplicated but in the reverse order on sleeve 27 and have been given the same reference numerals but with 100 added so they will be 206, 207, etc. instead of 106 and 107, etc., as above described. More than a pair of impellers could be carried on one sleeve if desired.

The drum 120 is supported on flanges or discs 123 and 124 and rotation of the drum 120 rotates the gear 86.

Operation.

The operation of that embodiment of my invention which is illustrated in the drawings in the present case is as follows:

Rotation of the driving shaft 20 by means of its crank 24 oscillates the oscillator 37 about its pivot 47 in the block 70. This oscillation causes rocker R (arm 56, shaft 57 and arm 59) to rock which in turn oscillates lever 61. By means of the crank 25 oscillator 38 is oscillated which being connected to lever 60 by pin 68 oscillates that lever.

Movement of lever 61 back and forth oscillates sleeve 34.

Figure 5:
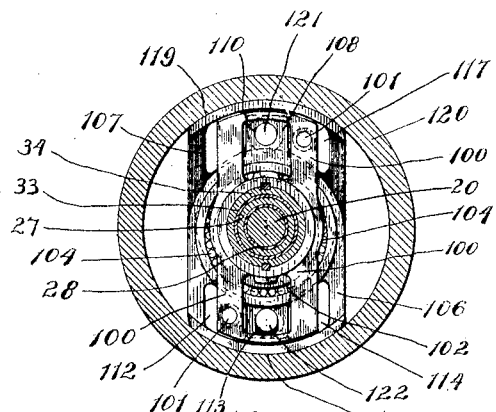
Fig. 5 is a section taken along 5—5 in Fig. 1 showing the interior of the impeller group and the impulse imparting elements looking toward the right in that figure.
Figure 6:
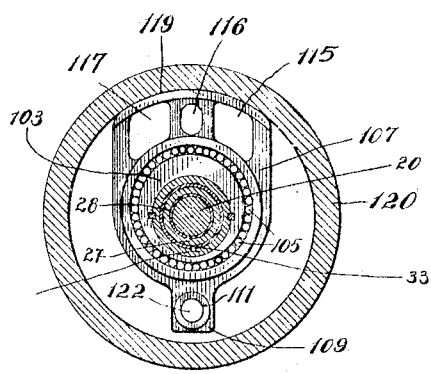
Fig. 6 is a similar view taken along 6—6 but looking to the left.

Movement of the sleeve 34 during oscillation or rocking, carries with it the eccentrics 102 and 103 which first shift the impellers 106 and 107 longitudinally of themselves until they firmly engage with the inside periphery of the drum 120 as shown in Fig. 5 when continued movement of the eccentrics through the medium of the rollers 104 and 105 causes the impellers and drum to move in a clockwise direction. The return oscillation of the eccentrics then first retracts the impeller by a movement longitudinally of itself and away from the said periphery to the position shown in Fig. 7, and finally the pins 101 carry the impeller back to the initial position. Thus, the impellers contact with the drum and impel it forward during their own forward movement but then on their return stroke they are free from the drum. Change of direction of the lever and sleeve again extends the impellers to grip and turn the drum as above described and these repeating steps are continued as long as desired. The plate 100 by means of its pins 101 will cause the units to be positively changed in the direction of their movement to overcome any tendency for them to stick to the drum 120.

Figure 7:
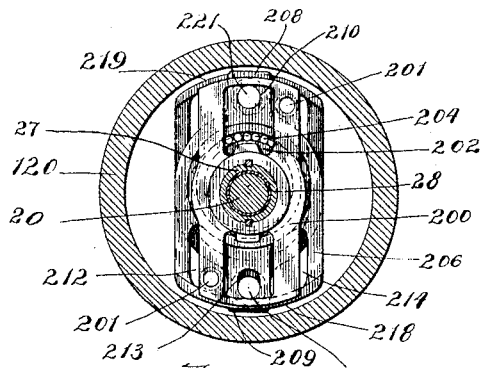
Fig. 7 is a similar view taken along 7—7 looking to the right.
Figure 8:
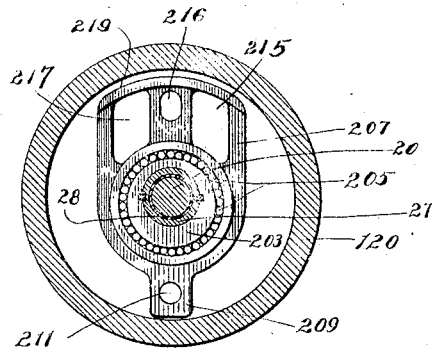
Fig. 8 is a similar view along 8—8 looking to the left.

Movement of lever 60 similarly oscillates sleeve 27 which in turn operates its pair of impellers 206 and 207 in exactly the same way as described for the sleeve 34 and impellers 106 and 107 except that their cycle is 180° behind that of 106 and 107 so that when 106 and 107 are free from the drum 120 as shown in Fig. 7, the other impellers 206 and 207 are in contact therewith. However, the pairs are so timed that one set grips the drum just before the other set lets go. In this way a continuity of drive of the drum is secured which prevents any jerking thereof. Rotation of the drum 120, through gear 86 meshing with gear 85 on collar 84, is transmitted to the driven shaft 82.

As above described and with the pivot of the oscillators in the relation shown in the drawings (Fig. 1), the drum 120 will be turned at its speed nearest that of the driving shaft 20 for both the upper and lower arms of the oscillators will be given their greatest sweep. This in turn will give the levers 60 and 61 their greatest sweep, which through the sleeves 27 and 34 will give the impellers their greatest sweep of movement and propulsion of the drum 120. As the pivot block 70 is lowered (from the position shown in Fig. 1) by means of handle 78 and bent levers 72, the sweep of the oscillators is lessened and their associated parts will move less together with the impellers so that the drum is moved slower. Thus the speed of the drum (and driven shaft) can be varied in relation to the driving shaft 20 by lowering or raising the block 70 in which is pivoted the oscillators 37 and 38. At its lowest point, the pivot is so low and the sweep of the oscillators so slight together with their associated parts, that the impellers do not move sufficiently to rotate the drum and in effect the whole mechanism "idles."

Assuming the driving shaft 20 to be running uniformly with the oscillator pivots in lowest position and the mechanism idles. Upon raising the handle 78 to the first notch moving the pivot up one step, the mechanism begins to function and the drum 120 is moved at its slowest relation to the driving shaft. No clutch in addition to the variable speed transmission elements is used. The sweep of the oscillators and associated parts is increased just enough and cause the impellers to move sufficiently to rotate the drum 120 slowly. Then the handle 78 is moved up another notch to speed up the driven shaft until the pivot of the oscillators has reached its highest point and the drum is going its fastest in relation to the driving shaft.

Then if the direct speed is required, the lever 87 is operated to slide coupling 84 along to disconnect gear 85 from gear 86 operated from the drum and gear 85 is caused to mesh with gear 26 keyed to driving shaft 20 so that the driving shaft and the driven shaft are then directly connected together and the variable speed mechanism is "cut out" so far as any driving goes.

Figure 1:
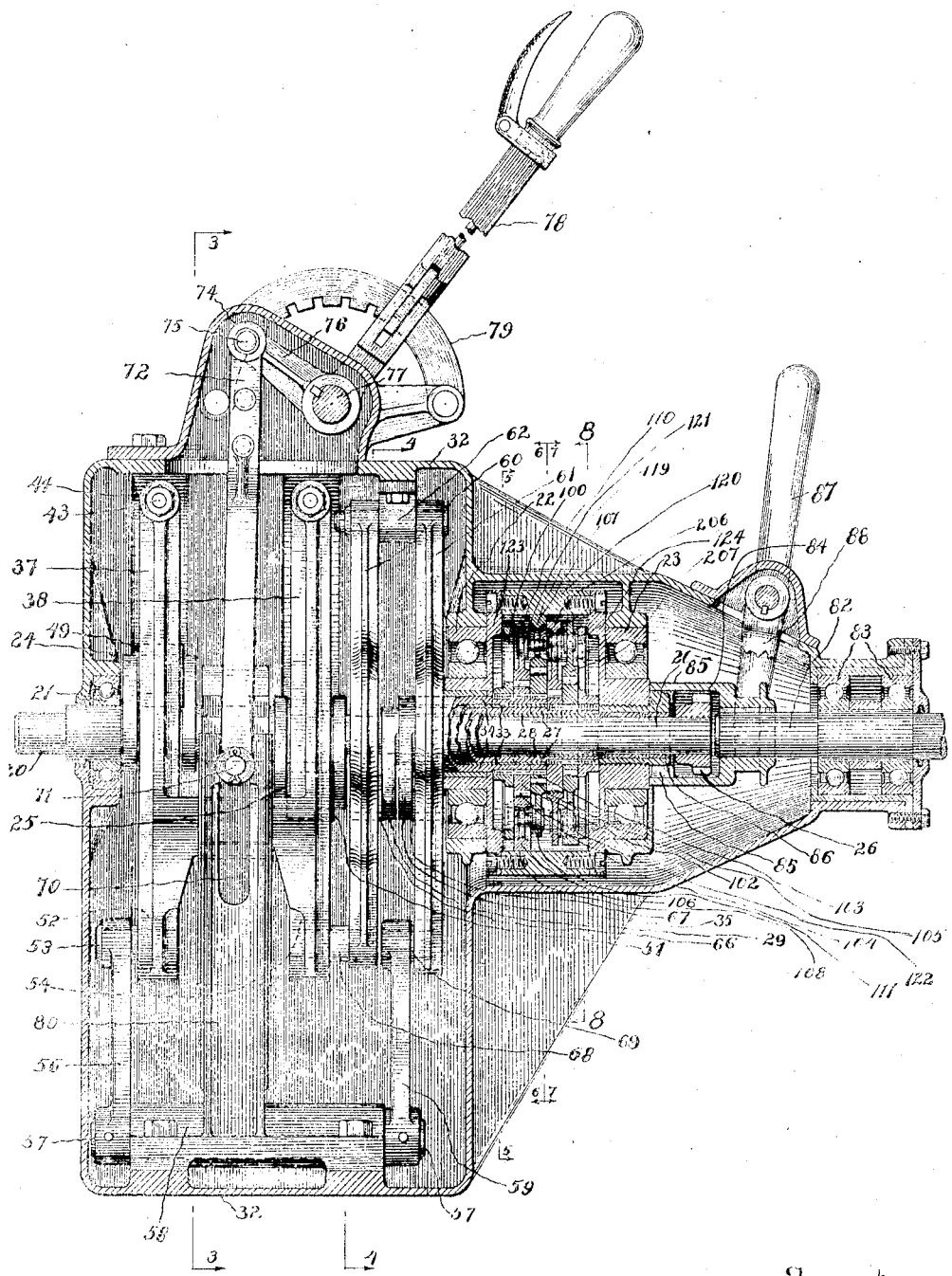
Figure 1 is longitudinal section of the device showing the cranks in vertical planes.
Figure 2:
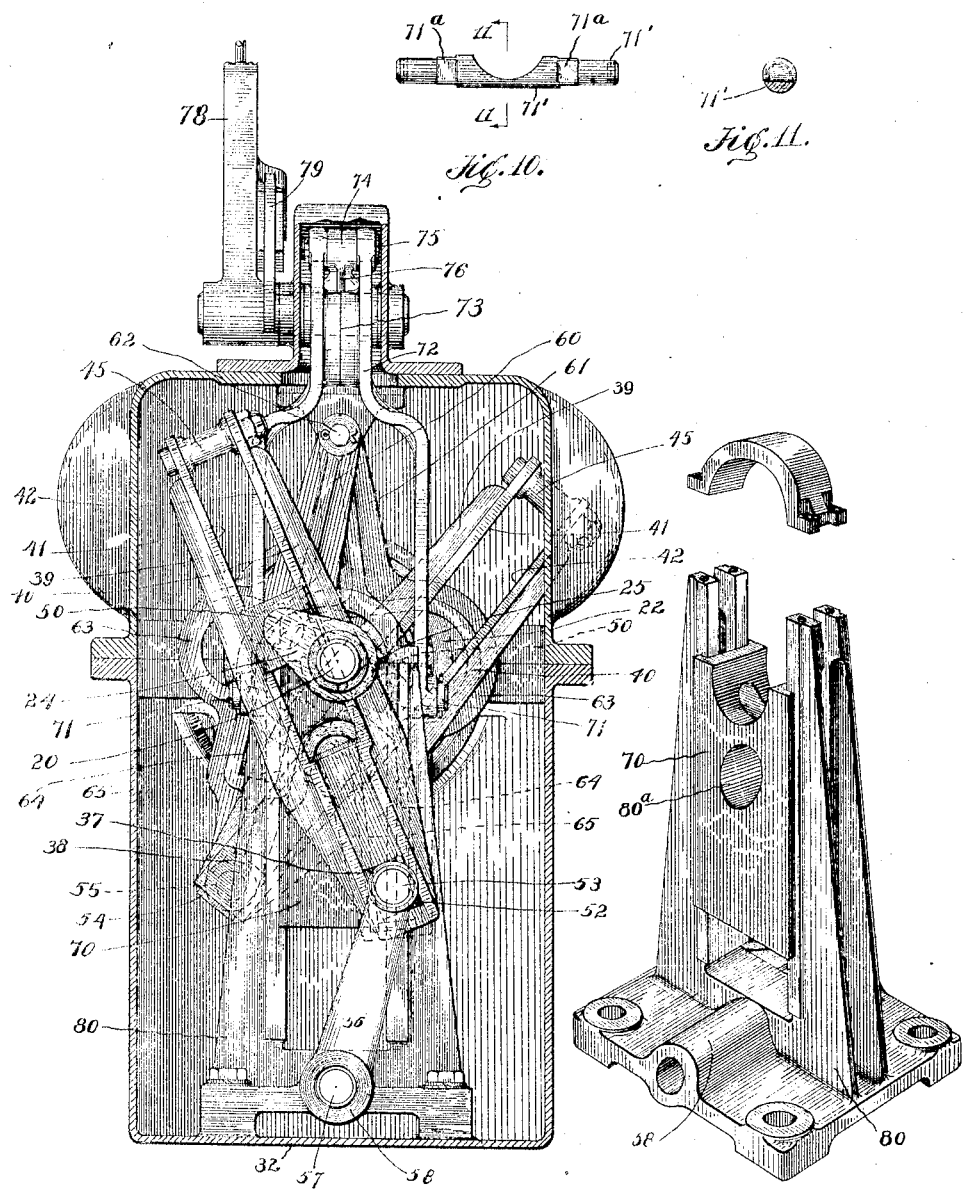
Fig. 2 is an end view, with the casing broken away to show the interior and showing the cranks at an angle of 60° from the vertical.

Conversely, if the driven shaft is directly connected to the driving shaft as just described, and the operator desired to diminish its speed, the lever 87 is moved to the right in Fig. 1 which disconnects gear 85 from 26 and causes it to mesh with gear 86 which throws the variable speed mechanism into driving operation again but at its ratio nearest 1 and then if less speed is desired, the pivot of the oscillators is lowered until the desired fractional ratio of speed is obtained.

This invention can be used in any machine where a control for variable speed is desirable and if used in such a machine, it can displace all the usual clutches and meshing gears in the speed control mechanism. Examples of such use are: the entire automotive field, all machine shop equipment as lathes, drills, slotters, etc., pumps, wind and water mills, boats and so forth; it being clearly understood that the invention is not limited to any special or particular use.

Having thus described my invention, what I claim as new and desire to secure by Letters Patent is:

1. In a variable speed transmission mechanism, the combination of an element to be driven which has a surface of revolution, an impeller having a working face that is complemental to said surface of revolution, an eccentric that is mounted on said center of revolution, means for oscillating said eccentric, said impeller being mounted on said eccentric, and rigid means for effecting the return stroke of said impeller.

2. In a variable speed transmission mechanism, the combination of an element to be driven which has a surface of revolution, an impeller having a working face that is complemental to said surface of revolution, an eccentric that is mounted on a center of revolution coincident with that of said surface of revolution, means for oscillating said eccentric, said impeller being mounted on said eccentric, and rigid means for effecting the return stroke of said impeller and for limiting its return movement.

3. In a variable speed transmission mechanism, the combination of an element to be driven which has a surface of revolution, an impeller having a working face that is complemental to said surface of revolution, an eccentric that is mounted on a shaft having an axis that is coincident with that of said surface of revolution, means for oscillating said eccentric, said impeller being mounted on said eccentric, and positive means carried by said shaft for effecting the return stroke of said impeller.

4. In a variable speed transmission mechanism, the combination of an element to be driven which has a surface of revolution, an impeller having a working face that is complemental to said surface of revolution, an eccentric that is mounted on a shaft having an axis that is coincident with that of said surface of revolution, means for oscillating said eccentric, said impeller being mounted on said eccentric, and automatic means carried by said shaft for effecting the return stroke of said impeller and for limiting its return movement.

5. In a variable speed transmission mechanism, the combination of an element to be driven which has a surface of revolution, an impeller having a working face that is complemental to said surface of revolution, an eccentric that is mounted on a shaft having an axis that is coincident with that of said surface of revolution, means for oscillating said eccentric, said impeller being mounted on said eccentric, and rigid means carried by said shaft for effecting the return stroke of said impeller, and for engaging said impeller with said driven member.

6. In a variable speed transmission mechanism, the combination of a rotatable member to be driven, which member has a surface of revolution, and oscillatable members whose centers of oscillation are coincident with the center of said surface of revolution, eccentrics mounted on said oscillatable members, impellers mounted on said eccentrics and having working faces that are complemental to said surface of revolution, and means for automatically shifting said impellers relative to said eccentrics to cause them to engage said driven member and to cause said impellers to return to initial position after the working stroke.

7. In a variable speed transmission mechanism, the combination of a rotatable member to be driven, which member has a surface of revolution, and oscillatable members whose centers of oscillation are coincident with the center of said surface of revolution, eccentrics mounted on said oscillatable members, impellers mounted on said eccentrics and having working faces that are complemental to said surfaces of revolution, and means for automatically shifting said impellers relative to said eccentrics to cause them to engage said driven member and to cause said impellers to return to initial position after the working stroke, said eccentrics and said controlling means being timed so as to cause said impellers to operate alternately.

8. In a variable speed transmission mechanism, the combination of an element to be driven which has a surface of revolution, an impeller having a working face that is complemental to said surface of revolution, an eccentric that is mounted on a center of revolution coincident with that of said surface of revolution, said impeller being mounted on said eccentric, and automatic means carried by said shaft for effecting the return stroke of said impeller and for limiting its return movement.

9. In a variable speed transmission mechanism, the combination of an element to be driven which has a surface of revolution, an impeller having a working face that is complemental to said surface of revolution, an eccentric that is mounted on a shaft having an axis that is coincident with that of said surface of revolution, means for oscillating said eccentric, said impeller being mounted on said eccentric, positive means carried by said shaft for effecting the return stroke of said impeller, and means for oscillating said last-mentioned means.

10. In a variable speed transmission mechanism, the combination of an element to be driven which has a surface of revolution, an impeller having a working face that is complemental to said surface of revolution, an eccentric that is mounted on a shaft having an axis that is coincident with that of said surface of revolution, means for oscillating said eccentric, said impeller being mounted on said eccentric, automatic means carried by said shaft for effecting the return stroke of said impeller and for limiting its return movement, and means for oscillating said limiting means.

11. In a variable speed transmission mechanism, the combination of an element to be driven which has a surface of revolution, an impeller having a working face that is complemental to said surface of revolution, an eccentric that is mounted on a shaft having an axis that is coincident with that of said surface of revolution, means for oscillating said eccentric, said impeller being mounted on said eccentric, rigid means carried by said shaft for effecting the return stroke of said impeller and for engaging said impeller with said driven member, and means for oscillating said returning means.

12. In a variable speed transmission mechanism, the combination of a rotatable member to be driven, which member has a surface of revolution, and oscillatable members whose centers of oscillation are coincident with the center of said surface of revolution, eccentrics mounted on said oscillatable members, impellers mounted on said eccentrics and having working faces that are complemental to said surface of revolution, means for automatically shifting said impellers relative to said eccentrics to cause them to engage said driven member and to cause said impellers to return to initial position after the working stroke, and means for oscillating said last-mentioned means.

13. In combination, a driving member, a driven member, a compound intermediary capable of oscillatory movement and interconnecting the two members, means varying the pivotal center of the intermediary to determine the amplitude of its oscillations, a sleeve mechanism driven from said intermediary, and a plurality of impeller shoes driven from said sleeve mechanism.

14. In combination, a driving member, a driven member, an oscillatory intermediary interconnecting the two members and rectilinearly shiftable to determine the amplitude of its oscillations, a sleeve mechanism driven from said intermediary, and a plurality of adjacent impeller shoes driven from said sleeve mechanism.

15. In combination, a driving member, a driven member, an oscillatory intermediary interconnecting the two members and shiftable to positions varying the amplitude of its oscillations, sleeves operated from said intermediary, a rotary element associated with the driven member, a friction surface carried by said element, a plurality of impeller shoes supported from the sleeves and operable into and out of engagement with said friction surface to impart the power impulses of the driven member to the rotary element.

16. In combination, a driving member, a driven member, an oscillatory intermediary interconnecting the two members and shiftable to vary the amplitude of its oscillations, a drum, a plurality of oppositely directed impeller shoes positioned on the driven member and cooperating with said drum to transmit movement of the driven member to the drum.

17. In combination, a driving member, a crank sleeve, an intermediary interconnecting the driving member and crank sleeve, said intermediary being positioned for oscillatory movement and shiftable to vary the amplitude of its oscillations, a drum, an impeller device embodying co-acting members, a plurality of said members being mounted on the crank sleeve and adapted to transmit motion from crank-sleeve to drum.

18. In combination, a driving member, a crank-sleeve, a sliding connection between said member and crank-sleeve, said connection being mounted for oscillatory movement and shiftable to vary the amplitude of its oscillations, a drum, an impeller comprising a plurality of longitudinally movable co-acting members positioned on said crank-sleeve and adapted to transmit motion from crank-sleeve to drum.

19. In combination, a driving member, a crank-sleeve, a compound sliding connection between said member and crank-sleeve, said connection being mounted for oscillatory movement and shiftable to vary the amplitude of its oscillations, a drum, a plurality of impellers mounted and radially extending from said crank-sleeve to alternatingly engage the drum and transmit movement of crank-sleeve to the drum.

20. In combination with a transmission, an impeller mechanism having an element to be driven, an oscillatable sleeve, another oscillatable sleeve within the first sleeve, and a set of intermittent grip devices operated by each sleeve and adapted to rotate said element.

21. The device of the preceding claim with the intermittent grip devices being slidable longitudinally of each other and means for preventing relative lateral movement thereof.

22. In combination in a transmission, an element to be driven, a plurality of oscillators pivoted intermediate of their length, a lever pivoted at one end for each oscillator, a connection between each co-acting oscillator and lever, a sleeve rocked by each lever, and a plurality of longitudinally movable oppositely directed grip devices operated by said sleeves adapted to rotate said element.

23. In combination, a driving member, a driven member, oscillators operated from the driving member, a lever pivoted at one end for each oscillator and connected thereto, whereby each oscillator oscillates its corresponding lever, a sleeve oscillated by each lever, an impeller device operated by each sleeve for driving the driven element.

24. The device of claim 23 in which one oscillator is connected to its lever through the medium of a rock shaft.

25. In combination, a driving member, a driven member, a plurality of oscillatable impellers for rotating the driven member, sleeve means concentric with the driven member for operating said impellers, arms on said sleeve means, oscillators oscillated from the driving member, and heart-shaped levers fulcrumed away from the center of said sleeve means and oscillated by said oscillators, said levers engaging said arms on said sleeve means nearer to the center of said sleeve means than the fulcrum of the levers whereby the sleeve means are oscillated through a relatively long movement.

26. In a variable speed transmission, in combination a rotatable driven member having a surface of rotation, an impelling member having a surface adapted to be pressed against said surface of rotation, an eccentric encircled by said impelling member mounted on an axis of rotation of said driven member and adapted to force said impelling member against said driven member, and means to cause the resistance to rotation between said eccentric and said impelling member to be less than that between said surfaces and means for oscillating said eccentric.

27. In a variable speed transmission, in combination a rotatable driven member having a surface of rotation, an impelling member having a surface adapted to be pressed against said surface of rotation, an eccentric mounted on the axis of rotation of said driven member and adapted to force said impelling member against said driven member, and a series of rollers interposed between said eccentric and said impelling member and means for oscillating said eccentric.

28. In a variable speed transmission, the combination of rotatable driving and driven members, one of said members having a surface of rotation, a co-operating member having a surface adapted to be pressed against said surface of rotation, an eccentric mounted on the axis of said surface of revolution and adapted, through engagement of said co-operating member with said service of rotation, to transmit motion between said driving and driven member, and a series of rollers interposed between said eccentric and said co-operating member and means for oscillating said eccentric.

29. In a transmission, the combination of an element to be driven, intermittent grip devices for rotating the element oppositely directed and longitudinally movable on each other, and means for limiting the capacity of said devices for independent relative lateral movement.

30. In a transmission, the combination of an element to be driven, an oscillatable sleeve, means for oscillating said sleeve and oppositely directed longitudinally movable devices encircling said sleeve and adapted to rotate said element.

31. The device of claim 30 with eccentric means between the devices and the said sleeve.

32. The device of claim 30 with eccentric means supported from the said sleeve and anti-friction means between the eccentric means and the devices.

33. In combination, in a transmission, a driving shaft, and a driven shaft, two levers movable in opposite directions to counterbalance each other, linkages to operate the levers from the driving shaft, and further linkages to operate the driven shaft from the levers.

34. In a variable speed transmission, in combination a member having an extended surface of revolution, a member having a less extended complemental surface, means for forcing said surfaces together by a motion such that the surfaces shall be substantially parallel at the instant of engagement, for moving one of said members in the direction of motion desired to be given to the other member, for disengaging said members and moving the driving member contrary to the direction of said motion, and for re-engaging said members and automatic means for giving said first-mentioned means successive working strokes of varying speeds.

35. In a variable speed transmission, in combination a driven member and an impeller member having complemental surfaces, means for engaging said members by such a movement that at the instant of engagement said surfaces shall be substantially parallel, for moving the impeller member in the direction of motion, for disengaging said impeller member, and returning it in the opposite direction, and automatic means for giving said first-mentioned means successive working strokes of varying speeds.

36. In a transmission, in combination, a rotatable driven member having a surface of revolution, an impeller member having a complemental surface, an oscillating eccentric for forcing said surfaces together, said parts being so constructed that such surfaces shall approach each other in a parallel relation, means for moving said impeller in the direction of motion and anti-friction devices being interposed between said eccentric and said impeller member.

37. In a variable speed transmission mechanism, the combination of an element to be driven which has a surface of revolution, an impeller having a working face that is adapted to have surface contact with said surface of revolution, an eccentric that is mounted on a shaft having an axis that is coincident with that of said surface of revolution, means for oscillating said eccentric, said impeller being mounted on said eccentric, and automatic means for effecting the return stroke of the said impeller and for causing it thereafter to engage the driven member.

38. In a variable speed transmission mechanism, the combination of an element to be driven which has a surface of revolution, an impeller having a working face that is adapted to have surface contact with said surface of revolution, an eccentric that is mounted on a shaft having an axis that is coincident with that of said surface of revolution, means for oscillating said eccentric, said impeller being mounted on said eccentric, and rigid means for effecting the return stroke of the said impeller and for causing it thereafter to engage the driven member.

In testimony whereof I have signed my name to this specification.

DANIEL W. DRISCOLL.